United States Patent
Zhang

(10) Patent No.: US 8,023,593 B2
(45) Date of Patent: Sep. 20, 2011

(54) METHODS AND APPARATUS FOR CHANNEL ESTIMATION FOR WIDEBAND OFDM COMMUNICATION SYSTEMS

(75) Inventor: Yifeng Zhang, San Jose, CA (US)

(73) Assignee: NXP B.V., Eindhoven (NL)

( * ) Notice: Subject to any disclaimer, the term of this patent is extended or adjusted under 35 U.S.C. 154(b) by 1000 days.

(21) Appl. No.: 11/574,236

(22) PCT Filed: Aug. 26, 2005

(86) PCT No.: PCT/IB2005/052806
§ 371 (c)(1),
(2), (4) Date: Oct. 24, 2007

(87) PCT Pub. No.: WO2006/021939
PCT Pub. Date: Mar. 2, 2006

(65) Prior Publication Data
US 2009/0041134 A1    Feb. 12, 2009

Related U.S. Application Data

(60) Provisional application No. 60/605,065, filed on Aug. 26, 2004.

(51) Int. Cl.
*H04L 27/06* (2006.01)

(52) U.S. Cl. ........ 375/340; 375/229; 375/230; 375/231; 375/232; 375/233; 375/260; 375/316; 375/350; 370/203; 370/204; 370/206; 370/208; 370/210; 370/480

(58) Field of Classification Search .................. 375/260, 375/340, 350, 229–233, 316; 370/206, 210, 370/203, 204, 208, 480
See application file for complete search history.

(56) References Cited

U.S. PATENT DOCUMENTS

| | | | |
|---|---|---|---|
| 5,432,816 A | 7/1995 | Gozzo | |
| 7,039,004 B2 * | 5/2006 | Sun et al. | 370/208 |
| 7,161,896 B1 * | 1/2007 | Hart et al. | 370/206 |
| 2004/0151109 A1 * | 8/2004 | Batra et al. | 370/208 |
| 2005/0078598 A1 * | 4/2005 | Batra et al. | 370/206 |

* cited by examiner

*Primary Examiner* — Leon Flores

(57) ABSTRACT

Systems and methods according to the present invention provide channel estimation methods, systems and devices which determine a coarse channel estimate (40) and a fine channel estimate (66). The coarse channel (40) estimate can be determined based on the channel estimation sequence transmitted to the receiver and then used to detect header symbols. The header symbols can be used to calculate additional channel estimates which can then be combined with the coarse channel estimate (40) to determine a fine channel estimate (66).

10 Claims, 5 Drawing Sheets

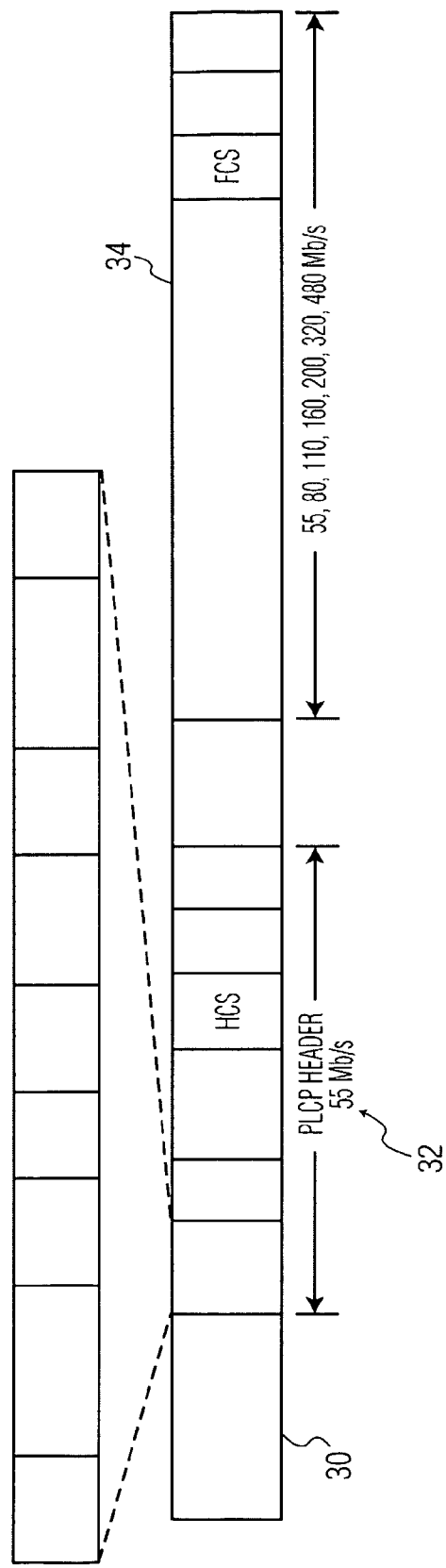

METHODS AND APPARATUS FOR CHANNEL ESTIMATION FOR WIDEBAND OFDM COMMUNICATION SYSTEMS

CROSS REFERENCE TO RELATED APPLICATION

This application claims the benefit of U.S. provisional application Ser. No. 60/605,065 filed Aug. 26, 2004, which is incorporated herein whole by reference.

The present invention relates generally to wireless communication systems and, more particularly, to channel estimation in orthogonal frequency division multiplexed (OFDM) wireless communication systems.

Technologies associated with the communication of information have evolved rapidly over the last several decades. For example, over the last two decades wireless communication technologies have transitioned from providing products that were originally viewed as novelty items to providing products which are the fundamental means for mobile communications. Perhaps the most influential of these wireless technologies were cellular telephone systems and products. Cellular technologies emerged to provide a mobile extension to existing wireline communication systems, providing users with ubiquitous coverage using traditional circuit-switched radio paths. More recently, however, wireless communication technologies have begun to replace wireline connections in almost every area of communications. Wireless local area networks (WLANs) are rapidly becoming a popular alternative to the conventional wired networks in both homes and offices.

Many of today's WLAN systems operate in accordance with the IEEE 802.11 standards, e.g., the IEEE 802.11a or 802.11g standards. These standards provide for the transmission of signals using orthogonal frequency division multiplexing (OFDM). In OFDM systems, a signal is split into several narrowband channels each of which is transmitted at a different frequency. More recently, OFDM has been proposed as an access methodology for ultra-wideband (UWB) systems. For example, multi-band OFDM has been proposed for use in a UWB system which spreads data over a very large bandwidth, e.g., on the order of 500 MHz, at low power and high data rates, e.g., up to 480 Mb/s. This combination of broader spectrum usage and lower power improves speed and reduces interference with other wireless spectra.

As with other wireless communication systems, certain technical challenges need to be addressed for UWB systems. One such challenge involves channel estimation. Channel estimation refers, generally, to techniques used by digital receivers to estimate the effect that a radio channel has on a transmitted signal so that the receiver can then compensate for those effects as part of the process to recover the transmitted data.

As described in more detail below, an exemplary UWB system includes a channel estimation sequence as part of a preamble transmitted in each frame. One way to perform channel estimation in UWB systems is to determine a frequency response associated with the received version of the channel estimation sequence and use the average of two such frequency responses as the current channel estimate. However, this technique results in approximately 1.7 dB of implementation loss, which adversely effects overall system performance. Using more complicated channel estimation techniques on the channel estimation sequence may, however, not provide a viable solution given the very high data rates (and resulting need for high levels of processing power to perform complex calculations) of UWB systems.

Accordingly, it would be desirable to provide techniques and devices for performing channel estimation in UWB transceivers which provide satisfactory performance without the problems of conventional techniques.

Systems and methods according to the present invention address this need and others by providing channel estimation methods, systems and devices which determine a coarse channel estimate and a fine channel estimate. The coarse channel estimate can be determined based on the channel estimation sequence transmitted to the receiver and then used to detect header symbols. The header symbols can be used to calculate additional channel estimates which can then be combined with the coarse channel estimate to determine a fine channel estimate.

According to one exemplary embodiment of the present invention, a method for wireless communication includes the steps of receiving a frame of data, the frame including a preamble portion, a header portion and a data portion, determining a coarse channel estimate using channel estimation symbols received in the preamble portion of the frame, processing the header portion of the frame of data using the coarse channel estimate to generate received header symbols, determining a fine channel estimate based on the coarse channel estimate and the header symbols and equalizing the data portion of the frame using the fine channel estimate.

According to another exemplary embodiment of the present invention, a transceiver includes a receiver for receiving a frame of data, the frame including a preamble portion, a header portion and a data portion, a processor for determining a coarse channel estimate using channel estimation symbols received in the preamble portion of the frame, processing the header portion of the frame of data using the coarse channel estimate to generate received header symbols, and determining a fine channel estimate based on the coarse channel estimate and the received header symbols and an equalizer for equalizing the data portion of the frame using the fine channel estimate.

The accompanying drawings illustrate exemplary embodiments of the present invention, wherein:

FIG. 2(a) depicts an exemplary OFDM frame format which can be used in conjunction with an exemplary embodiment of the present invention;

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
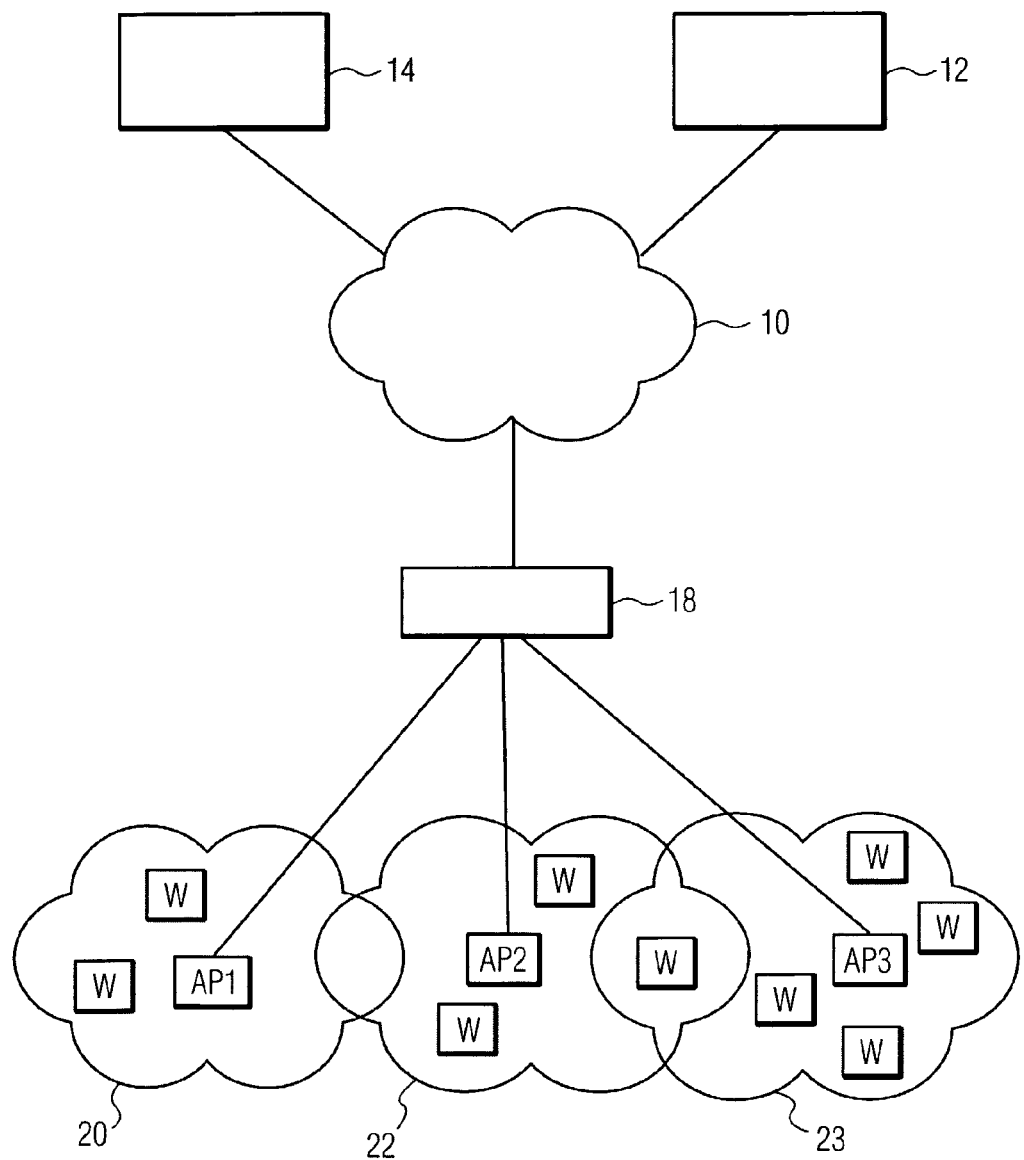
FIG. 1 depicts a WLAN system in which the present invention can be implemented.

In order to provide some context for this discussion, an exemplary WLAN system will first be described with respect to FIG. 1. Those skilled in the art will appreciate, however, that the present invention is not restricted to implementation in WLAN systems. Therein, a wireline network 10 (e.g., an Ethernet network) has a file server 12 and workstation 14 connected thereto. Those skilled in the art will appreciate that typical wireline networks will serve numerous fixed workstations 14, however only one is depicted in FIG. 1 for simplicity.

The wireline network 10 is also connected to a WLAN 16 via router 18. The router 18 interconnects the access points (AP) of the WLAN 16 with the wireline network, through which the access points can, for example, communicate with the file server 12. In the exemplary WLAN system of FIG. 1, three cells 20, 22 and 23 (also sometimes referred to as a Basic Service Set (BSS) or Basic Service Area (BSA) are shown each with a respective AP, although those skilled in the art will once again appreciate that more or fewer cells may be provided in WLAN 16. Within each cell, a respective AP serves a number of wireless stations (W) via a wireless connection. Note that wireless stations W may be any device, e.g., a personal computer, a personal digital assistant, a camera, a mobile phone, or any other device capable of communicating with a system via a UWB connection.

According to exemplary embodiments of the present invention, the transmission of signals between APs and respective wireless stations W is performed using OFDM signals, e.g., in accordance with IEEE P802.15-03/268r2 dated November 2003. Those skilled in the art will appreciate that this particular standard specification is simply used as an example of an OFDM physical layer which can be used in conjunction with the present invention and that other wireless standards or formats may be employed therewith. Devices and methods according to exemplary embodiments of the present invention provide techniques for receiving such OFDM signals and performing channel estimation thereon.

Figure 2B:
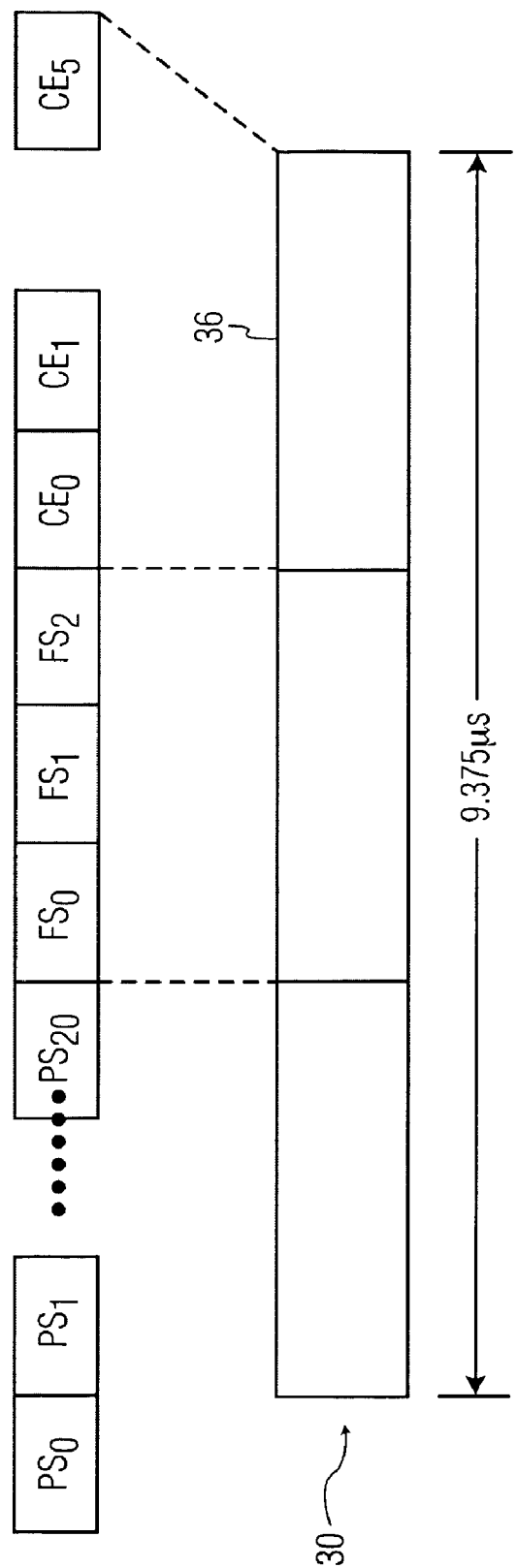
FIG. 2(b) shows the preamble portion of the OFDM frame format of FIG. 2(a) in more detail.

An exemplary format for data transmission according to exemplary embodiments of the present invention is illustrated in FIGS. 2(a) and 2(b). In FIG. 2(a), an OFDM frame format is shown which generally includes a preamble 30, a header 32 and a variable length payload (data) section 34. More detail regarding these various fields can be found in the above-identified IEEE standards proposal. FIG. 2(b) depicts the preamble section 30 in more detail. Therein, it can be seen that the channel estimation sequence 36 includes six OFDM symbols $C_0$-$C_5$. A three channel hopping sequence (i.e., periodic changing of sub-carriers by the same logical channel) is used in this exemplary UWB system. Accordingly; for any given frame of data, two of the six channel estimation symbols are usable to perform channel estimation depending upon the particular sub-carrier being employed for transmitting a particular frame, e.g., ($C_0$ and $C_3$, $C_1$ and $C_4$ or $C_2$ and $C_5$). These channel estimation symbols are predefined and known a priori by the receiver. Accordingly, as mentioned above, one technique for performing channel estimation on a received frame of data having the format depicted in FIGS. 2(a) and 2(b) is to determine the frequency response associated with reception of the appropriate pair of channel estimation sequence symbols and perform averaging on those frequency responses to determine a channel estimate. An example of the use of averaging to perform channel estimation can be found in U.S. Pat. No. 5,432,816, the disclosure of which is incorporated here by reference. However, as also mentioned above, use of this technique by itself may result in approximately 1.7 dB of implementation loss.

Figure 3:
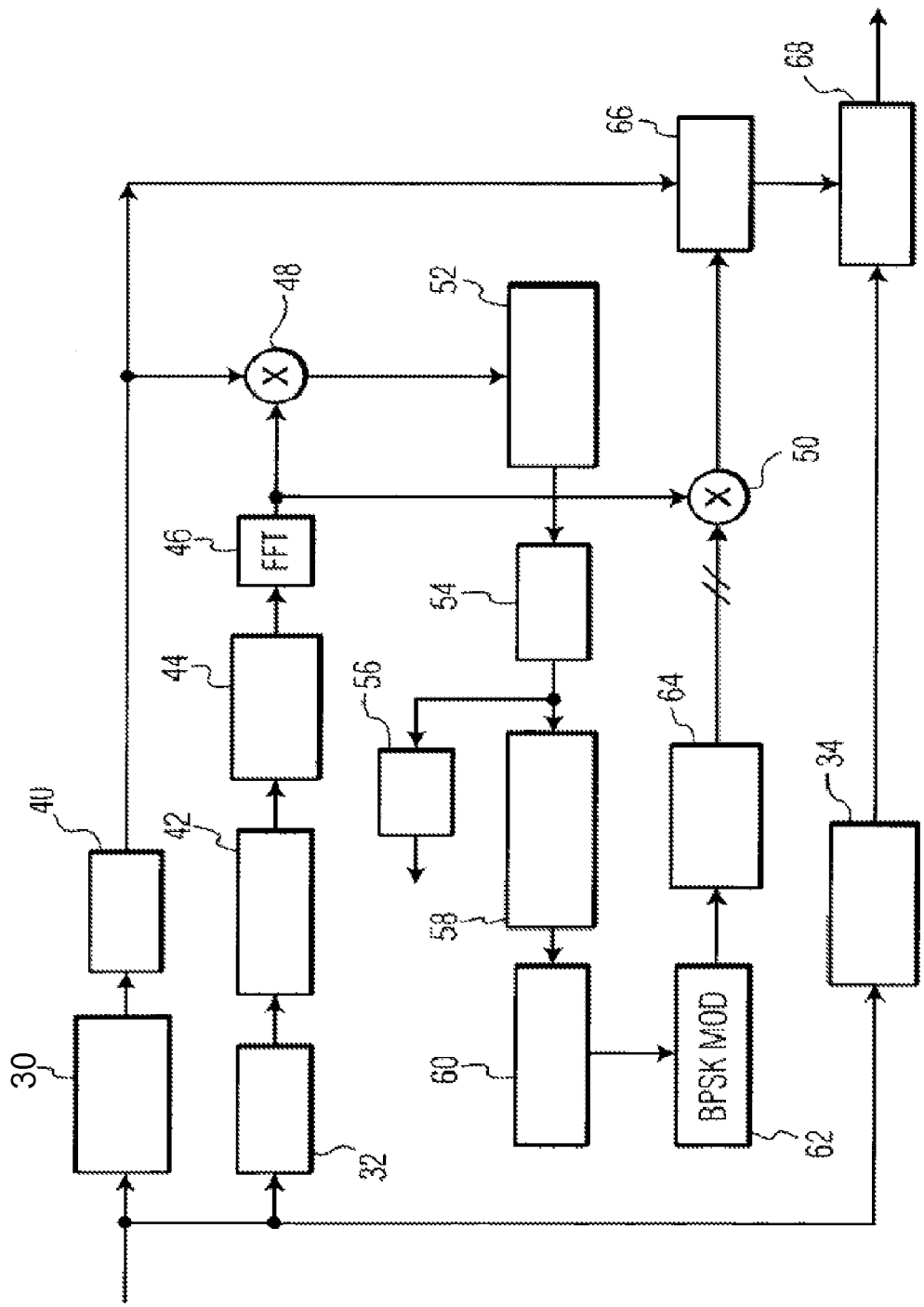
FIG. 3 is a process diagram illustrating channel estimation in a transceiver according to an exemplary embodiment of the present invention.

Thus, according to exemplary embodiments of the present invention, channel estimation can be performed using another technique which will now be described in conjunction with the flow diagram of FIG. 3. Therein, the OFDM frame is initially parsed into its component parts, e.g., the preamble 30, header 32 and payload data 34. For the purposes of this specification, a discussion of packet and frame synchronization is not particularly relevant and, accordingly, the processing associated with these portions of preamble 30 shown in FIG. 2(b) is not further described. The remainder of the preamble 30 is processed in block 40 as described above using, e.g., a least squares technique, to determine the channel distortion based on a comparison between the received versions of the appropriate channel estimation symbol pair and the stored, known values of this channel estimation symbol pair. Alternatively, other techniques (e.g., least mean square (LMS) averaging, maximal likelihood etc.) can be used to perform channel estimation in block 40. Regardless of the particular technique used to analyze reception of the channel estimation sequence portion of preamble 30, this results in an output of channel estimation function 40 which is referred to herein as a "coarse channel estimate" for this particular OFDM frame. The coarse channel estimate is then used both to decode the header symbols and to generate a fine channel estimate, as will now be described.

The header section 32 is initially processed in blocks 42-46. Therein, at CP remove function 42, the cyclic prefix (CP) associated with the OFDM signal is removed. Next, phase distortion associated with, e.g., frequency offset, is compensated for by phase rotation function 44. Then, the header section 32 is transformed into the frequency domain by Fast Fourier Transform (FFT) function 46 so that it can be multiplied with the coarse channel estimation at block 48. The frequency domain output of FFT 46 is also supplied to another multiplier 50 as described below. Once the header section 32 has been compensated for channel effects by multiplier 50, the information contained therein is de-interleaved at block 52 and decoded/demodulated using, e.g., a Viterbi decoder 54. The resultant information regarding, e.g., the rate at which the data section 34 was transmitted, is forwarded to the medium access control (MAC) layer for use in further processing of the received frame.

With respect to channel estimation in accordance with exemplary embodiments of the present invention, the header section 32 is then re-encoded, re-interleaved, modulated and mapped back onto its sub-carrier by blocks 58, 60, 62 and 64, respectively. This has the effect of returning the header section 32 to its transmission format, albeit the information contained therein has been compensated for channel effects by the coarse channel estimate. Note that the functions performed by blocks 58-64 are all transmitter functions and, therefore, the hardware and/or software associated with transforming the decoded version of the header section 32 back into a transmitted version of the header section 32 can simply be re-used from the transmitter chain of the transceiver, i.e., no new hardware/software needs to be added to perform this process for channel estimation purposes. The output of carrier mapping function 64 is input to multiplier 50 to be multiplied with the output of FFT 46. Referring to FIG. 2(a), the resulting frequency domain information output from FFT 46 includes six frequency domain symbols (one for each bit field), any two of which will be available for multiplication in multiplier 50 depending upon which of the three sub-carriers within the hopping sequence is being used to transmit this particular frame. Thus, multiplier 50 performs a mathematical comparison of the transmitted version of the header section 32 as compensated for using the coarse channel estimate with the received version of the header section 32 uncompensated for channel effects. Accordingly, assuming that the values associated with the header section 32 were correctly detected, the output of multiplier 50 provides two additional channel estimates which are then used to improve the coarse channel estimate at averaging function 66 to generate a fine channel estimate.

Since the effect of the noise term associated with the calculation of the channel estimate is reduced by averaging it over a greater number of symbols, averaging the channel estimate over the two symbols of the channel estimation sequence and over the two additional symbols from the header section 32 improves the accuracy of the fine channel estimate relative to the coarse channel estimate. This improvement is estimated to reduce the implementation loss associated with the channel estimate from approximately 1.7 dB to approximately less than 1 dB, by re-using existing hardware/software from the transmit chain and with little additional complexity. The fine channel estimate can then be supplied to an equalizer 68 which, e.g., to compensate the data section 34 for the channel effects it experienced during transmission.

As mentioned above, use of the header section 32 to calculate a fine channel estimate is based on the assumption that the header section 32 is correctly detected by the receiver. As seen in FIG. 2(*a*), the header section 32 includes information regarding, e.g., the band extension (this identifies which mode is used to transmit the data section 34) and the rate at which the data section 34 is being transmitted, e.g., one of 55, 80, 110, 160, 200, 320 and 480 Mb/s. The transmission rate also dictates other transmission criteria associated with the data section 34, e.g., modulation and coding rate, in UWB systems according to exemplary embodiments of the present invention. Given the nature of the information conveyed in the header section 32, absent correct reception of this information, the receiver will not be able to decode the data section 34. Accordingly, even though the information transmitted in the header section 32 is not known a priori to the receiver, exemplary embodiments of the present invention treat the header symbols as known information by assuming correct reception of the header section 32 for the purpose of using symbols within the header section 32 to perform channel estimation. Even if incorrect, this assumption will not adversely impact performance because the system will regardless be unable to decode the data section 34 of this frame and will need to take corrective action, e.g., retransmission.

Figure 4:
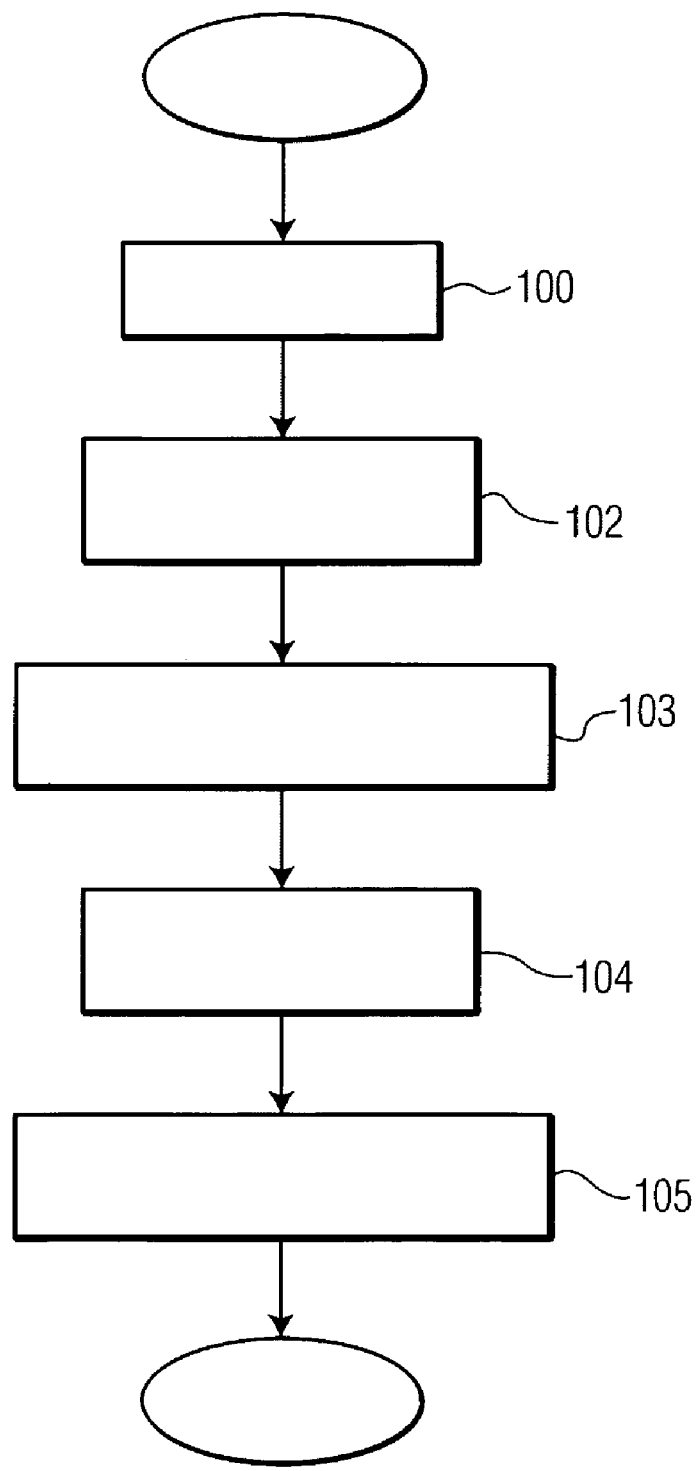
FIG. 4 is a flowchart which illustrates a method for performing channel estimation an exemplary embodiment of the present invention.

FIG. 4 is a flow chart depicting a method for wireless communication in accordance with an exemplary embodiment of the present invention. Therein, at step 100, a frame of data is received including a preamble portion, a header portion and a data portion. A course channel estimate is determined at step 102 using channel estimation symbols received in the preamble portion of the frame. Then, at step 103, the header portion is processed to determine they symbols received therein using the coarse channel estimate. A fine channel estimate is determined at step 104 using the coarse channel estimate and the header symbols. The data portion of the frame can then be equalized at step 105 using the fine channel estimate to output the detected data symbols.

Although the afore-described exemplary embodiments relate to using the header section of the frame to improve the channel estimate, the present invention is not so limited. Instead, channel estimation can be extended to use data symbols in addition to (or instead of) header symbols to perform channel estimation. Physically, transceivers according to the present invention can include a receiver chain, a transmitter chain and a processor for processing data associated with the receiver chain and the transmitter chain.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for wireless communication comprising the steps of: receiving a frame of data said frame including a preamble portion, a header portion and a data portion; determining a coarse channel estimate using channel estimation symbols received in said preamble portion of said frame; processing said header portion of said frame of data using said coarse channel estimate to generate received header symbols; determining a fine channel estimate based on said coarse channel estimate and said received header symbols; and equalizing said data portion of said frame using said fine channel estimate, wherein said step of processing said header portion of said frame of data using said coarse channel estimate to generate received header symbols further comprises the steps of: removing a cyclic prefix from said header portion; applying a phase rotation to said header portion; transforming said header portion into a frequency domain to generate frequency domain header symbols; and applying said coarse channel estimate to said frequency domain header symbols to generate channel compensated, frequency domain header symbols, wherein said step of determining said fine channel estimate based on said coarse channel estimate and said header symbols further comprises the steps of: re-encoding said channel compensated, frequency domain header symbols into a transmission format; comparing said re-encoded, channel compensated, frequency domain header symbols with said frequency domain header symbols to generate at least one channel estimate; and averaging said at least one channel estimate with said coarse channel estimate to generate said fine channel estimate.

2. The method of claim 1, wherein said frame of data is part of an orthogonal frequency division multiplexed (OFDM) signal.

3. The meth of claim 1, wherein said step of determining said coarse channel estimate further comprises the steps of: comparing a received value associated with at least one channel estimation symbol with a stored value of said at least one channel estimation symbol to determine said coarse channel estimate.

4. The method of claim 1, further comprising the steps of: processing said data portion of said frame of data using said coarse channel estimate to generate received data symbols; and determining said fine channel estimate based on said coarse channel estimate, said received header symbols and said received data symbols.

5. The method of claim 1, wherein said preamble portion includes six frequency domain channel estimation symbols and said header portion includes six frequency domain symbols.

6. A transceiver comprising: a receiver for receiving a frame of data, said frame including a preamble portion a header portion and a data portion a processor for determining a coarse channel estimate using channel estimation symbols received in said preamble portion of said frame, processing said header portion of said frame of data using said coarse channel estimate to generate received header symbols, and determining a fine channel estimate based on said coarse channel estimate and said received header symbols; and an equalizer for equalizing said data portion of said frame using said fine channel estimate, wherein said processor processes said header portion of said frame of data using said coarse channel estimate to generate received header portion of said frame of data using said coarse channel estimate to generate received header symbols by removing a cyclic prefix from said header portion, applying a phase rotation to said header portion, transforming said header portion into a frequency domain to generate frequency domain header symbols and applying said coarse channel estimate to said frequency domain header symbols to generate channel compensated, frequency domain header symbols, further comprising: a transmitter, wherein said transmitter is used in determining said fine channel estimate by re-encoding said channel compensated, frequency domain header symbols into a transmission format, comparing said re-encoded, channel compensated, frequency domain header symbols with said frequency domain header symbols to generate at least one channel estimate and averaging said at least one channel estimate with said coarse channel estimate to generate said fine channel estimate.

7. The transceiver of claim 6, wherein said frame of data is part of an orthogonal frequency division multiplexed (OFDM) signal.

8. The transceiver of claim 6, wherein said processor determines said coarse channel estimate by comparing a received value associated with at least one channel estimation symbol with a stored value of said at least one channel estimation symbol to determine said coarse channel estimate.

9. The transceiver of claim 6, wherein said processor also processes said data portion of said frame of data using said coarse channel estimate to generate received data symbols and determines said fine channel estimate based on said coarse channel estimate, said received header symbols and said received data symbols.

10. The transceiver of claim 6, wherein said preamble portion includes six frequency domain channel estimation symbols and said header portion includes six frequency domain symbols.

* * * * *